US012612264B2

(12) United States Patent
Park

(10) Patent No.: US 12,612,264 B2
(45) Date of Patent: Apr. 28, 2026

(54) ARTICLE TRANSFERRING APPARATUS AND ARTICLE TRANSFERRING METHOD

(71) Applicant: SEMES CO., LTD., Cheonan-si (KR)

(72) Inventor: Kyu Hyung Park, Suwon-si (KR)

(73) Assignee: SEMES CO., LTD., Chungcheongnam-Do (KR)

( * ) Notice: Subject to any disclaimer, the term of this patent is extended or adjusted under 35 U.S.C. 154(b) by 189 days.

(21) Appl. No.: 18/543,328

(22) Filed: Dec. 18, 2023

(65) Prior Publication Data

US 2024/0199346 A1 Jun. 20, 2024

(30) Foreign Application Priority Data

Dec. 19, 2022 (KR) ........................ 10-2022-0178461

(51) Int. Cl.
| | |
|---|---|
| *B65G 47/53* | (2006.01) |
| *B65G 17/20* | (2006.01) |
| *B65G 19/02* | (2006.01) |

(52) U.S. Cl.
CPC ............. *B65G 47/53* (2013.01); *B65G 17/20* (2013.01); *B65G 19/025* (2013.01)

(58) Field of Classification Search
CPC ....... B65G 47/53; B65G 17/20; B65G 19/025
USPC ........................................ 198/465.4, 678.1
See application file for complete search history.

(56) References Cited

U.S. PATENT DOCUMENTS

| | | | | |
|---|---|---|---|---|
| 7,584,017 B2 * | 9/2009 | Sugano | ................ | B65G 1/0485 |
| | | | | 700/228 |
| 2010/0202861 A1 * | 8/2010 | Sawado | ............ | H01L 21/67736 |
| | | | | 414/222.02 |
| 2012/0067704 A1 * | 3/2012 | Nakagawa | ........ | H01L 21/67733 |
| | | | | 198/678.1 |
| 2023/0211961 A1 * | 7/2023 | Park | .................. | H01L 21/67736 |
| | | | | 198/803.3 |

FOREIGN PATENT DOCUMENTS

| | | | | | |
|---|---|---|---|---|---|
| KR | 10-2010-0005553 | A | 1/2010 | | |
| KR | 101019786 | B1 | 3/2011 | | |
| KR | 20190054572 | A * | 5/2019 | ....... | H01L 21/67715 |
| KR | 10-2021-0017444 | A | 2/2021 | | |
| KR | 20210041345 | A * | 4/2021 | ....... | H01L 21/67727 |
| KR | 10-2021-0115424 | A | 9/2021 | | |
| KR | 10-2022-0091115 | A | 6/2022 | | |

OTHER PUBLICATIONS

Korean Office Action dated May 2, 2024 issued in corresponding Korean Appln. No. 10-2022-0178461.

* cited by examiner

*Primary Examiner* — James R Bidwell
(74) *Attorney, Agent, or Firm* — HARNESS, DICKEY & PIERCE, P.L.C.

(57) ABSTRACT

Disclosed is an article transferring apparatus, including: a main rail provided along a ceiling of a substrate manufacturing line in which process modules for treating a substrate are arranged; a main transferring vehicle moving along the main rail and for loading and unloading a container containing a substrate to and from the process module; a sub-rail installed on a ceiling corresponding to an upper portion of (Continued)

the process module; and a sub-transferring vehicle moving along the sub-rail and dedicated to loading and unloading a container between a first loading part and a second loading part of the process module.

17 Claims, 13 Drawing Sheets

100

ARTICLE TRANSFERRING APPARATUS AND ARTICLE TRANSFERRING METHOD

CROSS-REFERENCE TO RELATED APPLICATIONS

This application claims priority to and the benefit of Korean Patent Application No. 10-2022-0178461 filed in the Korean Intellectual Property Office on Dec. 19, 2022, the entire contents of which are incorporated herein by reference.

TECHNICAL FIELD

The present invention relates to an apparatus and a method of transferring an article.

BACKGROUND ART

In general, in order to manufacture a semiconductor device, various types of processes, such as deposition, photography, and etching, are performed, and devices performing each of these processes are arranged in a semiconductor manufacturing line. Objects, such as wafers or masks, for performing a semiconductor device manufacturing process may be provided to each semiconductor process device in a state of being accommodated in a container. Additionally, the processed objects may be transferred in the state of being container in the container.

The container is transferred by the Overhead Hoist Transport (hereinafter, referred to as a container transferring device). The container transferring device transfers a container containing an object to a load port of one of the semiconductor process devices. The container transferring device may also pick up the container containing the processed object from the load port and transfer the container to the outside, or transfer the container to another one of the semiconductor process devices.

FIG. 14 is a diagram for illustrating a container loading/unloading process in a post-process illustrated.

As shown in FIG. 14, a container transferring device 1 performs an operation of loading a container 9 into an in-port 3 of a post-processing illustrated 2, an operation of transferring the empty container 9 from which a substrate is carried out to an out-port 4, and an operation of unloading the container from the out-port 4 when a finished substrate is carried in the container 9. In these post-process illustrated, the number of transferring by the container transferring device in the FAB increases, causing congestion.

SUMMARY OF THE INVENTION

The present invention has been made in an effort to provide an article transferring apparatus and an article transferring method that may improve transferring efficiency.

The present invention has been made in an effort to provide an article transferring apparatus and an article transferring method suitable for a process facility requiring container transfer between an in-port and an out-port.

The object of the present invention is not limited thereto, and other objects not mentioned will be clearly understood by those of ordinary skill in the art from the following description.

An aspect of the present invention provides an article transferring apparatus, including: a main rail provided along a ceiling of a substrate manufacturing line in which process modules for treating a substrate are arranged; a main transferring vehicle moving along the main rail and for loading and unloading a container containing a substrate to and from the process module; a sub-rail installed on a ceiling corresponding to an upper portion of the process module; and a sub-transferring vehicle moving along the sub-rail and dedicated to loading and unloading a container between a first loading part and a second loading part of the process module.

Further, the article transferring apparatus may further include a control unit for outputting a transfer command of the container to the main transferring vehicle and the sub-transferring vehicle, in which the control unit may stop transferring the container of the sub-transferring vehicle when the main transferring vehicle loads or unloads the container to or from the first loading part or the second loading part to prevent a collision between the main transferring vehicle and the sub-transferring vehicle.

Further, the first loading part may be loaded with a container containing a substrate that is not process-treated, and the second loading part may be loaded with a container containing a substrate that has been process-treated.

Further, the sub-transferring vehicle may transfer the container from the first loading part to the second loading part, and the sub-transferring vehicle transfers the container which is empty because a substrate that is not process-treated is inserted into the process module.

Further, the main transferring vehicle may load the container containing the substrate that is not process-treated to the first loading part, and unload the container containing the substrate that has been process-treated from the second loading part.

Further, the sub-transferring vehicle may further include a detection sensor for detecting the main transferring vehicle.

Further, the sub-rail may be disposed to pass through upper portions of the first loading part and the second loading part.

Further, the sub-rail may be provided to be parallel with the main rail.

Further, the main transferring vehicle may include: a vehicle moving along the main rail; a main body connected to the vehicle, and providing an interior space in which a container is located; a hoist unit provided in the main body, and for hoisting a belt by winding or unwinding the belt; a hand unit fixed to one end of the belt, and for gripping a container; and a slide unit for moving the hoist unit in a horizontal direction.

Further, the sub-transferring vehicle may include: a moving body moving along the sub-rail; a hoist unit for hoisting a belt by winding or unwinding the belt; and a hand unit fixed at one end of the belt, and for gripping the container.

Further, in the process module, the first loading part and the second loading part may be provided to be parallel with the sub-rail, and the sub-rail may be provided on the at least one process modules.

Another aspect of the present invention provides an article transferring method, including: (a) loading a container containing a substrate into a first loading part of a process module; (b) moving the container placed in the first loading part to a second loading part of the process module; and (c) unloading the container placed in the second loading part, in which the operation (b) and the operations (a) and (c) are performed by different transferring vehicles.

Further, the operation of moving the container from the first loading part to the second loading part may be provided by a sub-transferring vehicle moving along a sub-rail installed on an upper portion of the process module, and the operation of loading of the container into the first loading part and unloading of the container from the second loading part may be provided by a main transferring vehicle moving along a main rail.

Further, when the main transferring vehicle loads or unloads the container to or from the first loading part or the second loading part, the sub-transferring vehicle may stop transferring the container and wait.

Further, in the operation (a), the container containing a substrate to be treated in the process module may be loaded to the first loading part, and in the operation (c), the container containing a substrate that has been treated in the process module may be loaded to the second loading part.

Further, in the operation (b), the container transferred by the sub-transferring vehicle may be in an empty state in which the substrate has been inserted into the process module.

Further, the sub-rail may be installed on the ceiling so as to be disposed in upper portions of the first loading part and the second loading part.

Further, in the operation (b), the sub-transferring vehicle may be provided with process progress information from the process module through a communication module.

Still another aspect of the present invention provides an article transferring apparatus, including: a main rail provided along a ceiling of a substrate manufacturing line in which process modules for treating a substrate are arranged; a main transferring vehicle moving along the main rail and loading and unloading a container containing a substrate to and from the process module; a sub-rail installed on a ceiling corresponding to an upper portion of the process module; and a sub-transferring vehicle moving along the sub-rail and dedicated to loading and unloading a container between a first loading part and a second loading part of the process module; and a control unit for outputting a transfer command of the container to the main transferring vehicle and the sub-transferring vehicle, in which the control unit stops transferring the container of the sub-transferring vehicle when the main transferring vehicle loads or unloads the container to or from the first loading part or the second loading part to prevent a collision between the main transferring vehicle and the sub-transferring vehicle, the main transferring vehicle loads a container containing a substrate that is not process-treated to the first loading part, and unloads a container containing a substrate that has been process-treated from the second loading part, the sub-transferring vehicle transfers the container from the first loading part to the second loading part, and the container transferred by the sub-transferring vehicle is in an empty state in which the substrate that is not process-treated has been inserted into the process module.

Further, in the process module, the first loading part and the second loading part may be provided to be parallel with the sub-rail, and the sub-rail may be disposed in upper portions of the first loading part and the second loading part on the at least one process module, and is provided to be parallel with the main rail.

According to the embodiment of the present invention, it is possible to improve the transfer efficiency of the main transferring vehicle.

According to the embodiment of the present invention, the present invention is suitable for process equipment that requires container transfer between an in-port and an out-port.

The effect of the present invention is not limited to the foregoing effects, and those skilled in the art may clearly understand non-mentioned effects from the present specification and the accompanying drawings.

DETAILED DESCRIPTION

Figure 1:
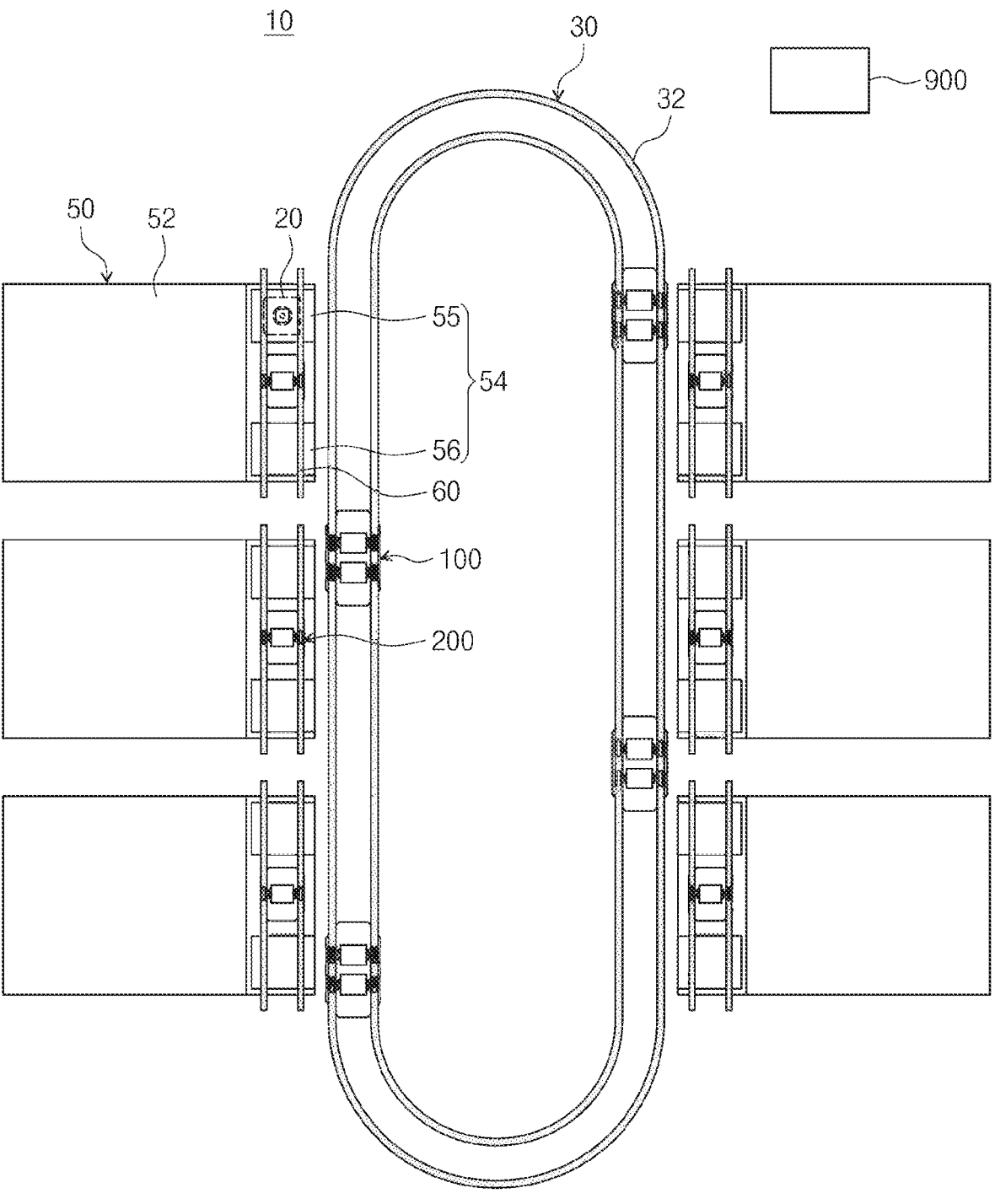
FIG. 1 is a top plan view of a transferring apparatus provided with an article transferring apparatus.

Example embodiments will now be described more fully with reference to the accompanying drawings. Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

When the term "same" or "identical" is used in the description of example embodiments, it should be understood that some imprecisions may exist. Thus, when one element or value is referred to as being the same as another element or value, it should be understood that the element or value is the same as the other element or value within a manufacturing or operational tolerance range (e.g., ±10%).

When the terms "about" or "substantially" are used in connection with a numerical value, it should be understood that the associated numerical value includes a manufacturing or operational tolerance (e.g., ±10%) around the stated numerical value. Moreover, when the words "generally" and "substantially" are used in connection with a geometric shape, it should be understood that the precision of the geometric shape is not required but that latitude for the shape is within the scope of the disclosure.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

FIG. 1 is an overall top plan view illustrating an article transferring apparatus.

As shown in FIG. 1, the article transferring apparatus 10 may include a main transferring vehicle 100 for transferring a transfer target article 20 to a transferring destination place 50, and a sub-transferring vehicle 200 for transferring the transfer target article 20 within the transferring destination place 50.

In the present embodiment, the main transferring vehicle 100 is within the article transferring apparatus 10 having a plurality of transferring destination places 50, and transfers the transfer target articles 20 to the transferring destination places 50, respectively. The transferring target article 20 is an object to be transferred, and may be, for example, a single article or a combination of multiple articles, such as a received object and a container for receiving the received article. In the present exemplary embodiment, the transferring target article 20 may be a container (Mask SMIF POD) that receives a photomask. However, the transferring target article 20 is not limited thereto, and may be a substrate accommodating container, such as a Front Opening Unified Pod (FOUP) in which a plurality of substrates is accommodated.

In the present exemplary embodiment, the transferring destination place 50 may include a processing device 52 and a loading place 54 for the transferring target article 20 to be loaded. For example, the processing device 52 may be a device that processes a semiconductor substrate and/or processes a photomask.

The loading place 54 of the transferring destination place 50 may include an in-port 55 and an out-port 56. The transferring target article 20 containing a photomask that is not process-treated is placed in the in-port 55. The transferring target article 20 is loaded into the in-port 55 by the main transferring vehicle 100. The transferring target article 20 containing the processed substrate from the processing device 52 is placed on the out-port 56. The transferring target article 20 is unloaded from the out-port 56 by the main transferring vehicle 100. The transferring target article is moved from the in-port 55 to the out-port 56. The transfer of the transferring target article from the in-port 55 to the out-port 56 is provided by the sub-transferring vehicle 200.

Referring to FIG. 1 again, the plurality of transferring destination places 50 is provided within the article transferring apparatus 10. For example, a transferring path 30 is provided in the article transferring apparatus 10 so as to pass through the plurality of transferring destination places 50. The transferring path 30 may be defined by a moving rail 32 connected to the ceiling.

The sub-transferring vehicle 200 may be provided to travel along the sub-rail 60. The sub-rail 60 may be provided on top of the loading place 54. Specifically, the sub-rail 60 may be installed to passes through the in-port 55 and out-port 56 when viewed in a plan view. The sub-transferring vehicle 200 performs the simple task of transferring the transferring target article 20, from which the substrate has been carried out and which is empty, from the in-port 55 to the out-port 56. The sub-transferring vehicle 200 may receive a transfer initiation signal from the processing device 52 via wireless communication. The processing device 52 carries out the substrate from the transferring target article 20 placed on the in-port 55. Upon completion of the carry-out of the substrate, the processing device 52 provides a transfer initiation signal to the sub-transferring vehicle 200. Upon receiving the transfer initiation signal, the sub-transferring vehicle 200 transfers the transferring target article 20 placed in the in-port 55 to the out-port 56. The transfer of the transferring target article 20 is accomplished in the state where the out-port 56 is emptied. For reference, the transfer initiation signal from the processing device 52 may be provided to a higher controller. The higher-level controller receiving the transfer initiation signal may transmit commands to the sub-transferring vehicle for the transfer of the transferring target article.

Here, a higher-level controller 90 may be an OHT Control System (OCS) that provides integrated control management of a plurality of article transferring apparatuses (the main transferring vehicle and the sub-transferring vehicle) to be inserted for the purpose of transferring the transferring target article in the semiconductor manufacturing process. The higher-level controller 900 receives the commands for the transfer from a Manufacturing Control System (MCS), which integrally manages the manufacturing device and article transferring system. The higher-level controller 900 may navigate the shortest route from the departure to the destination and select an article transferring apparatus that is optimally positioned to perform the transfer operation in order to allow the transfer operation to be completed in the shortest amount of time, and issue transfer commands to the article transferring apparatus. At this time, loading/unloading information of the transferring target article to be transferred is also provided to a control unit (190 and 290; shown in FIG. 5).

In the following, the present invention will be described based on the case where the article transferring apparatus 10 transfers a container containing a photomask to semiconductor process devices disposed on a semiconductor manufacturing line as an example. However, the present invention is not limited thereto, the article transferring apparatus of the present embodiment may be equally or similarly applicable to a variety of manufacturing lines requiring the transfer of articles and/or containers in which articles are accommodated.

Figure 2:
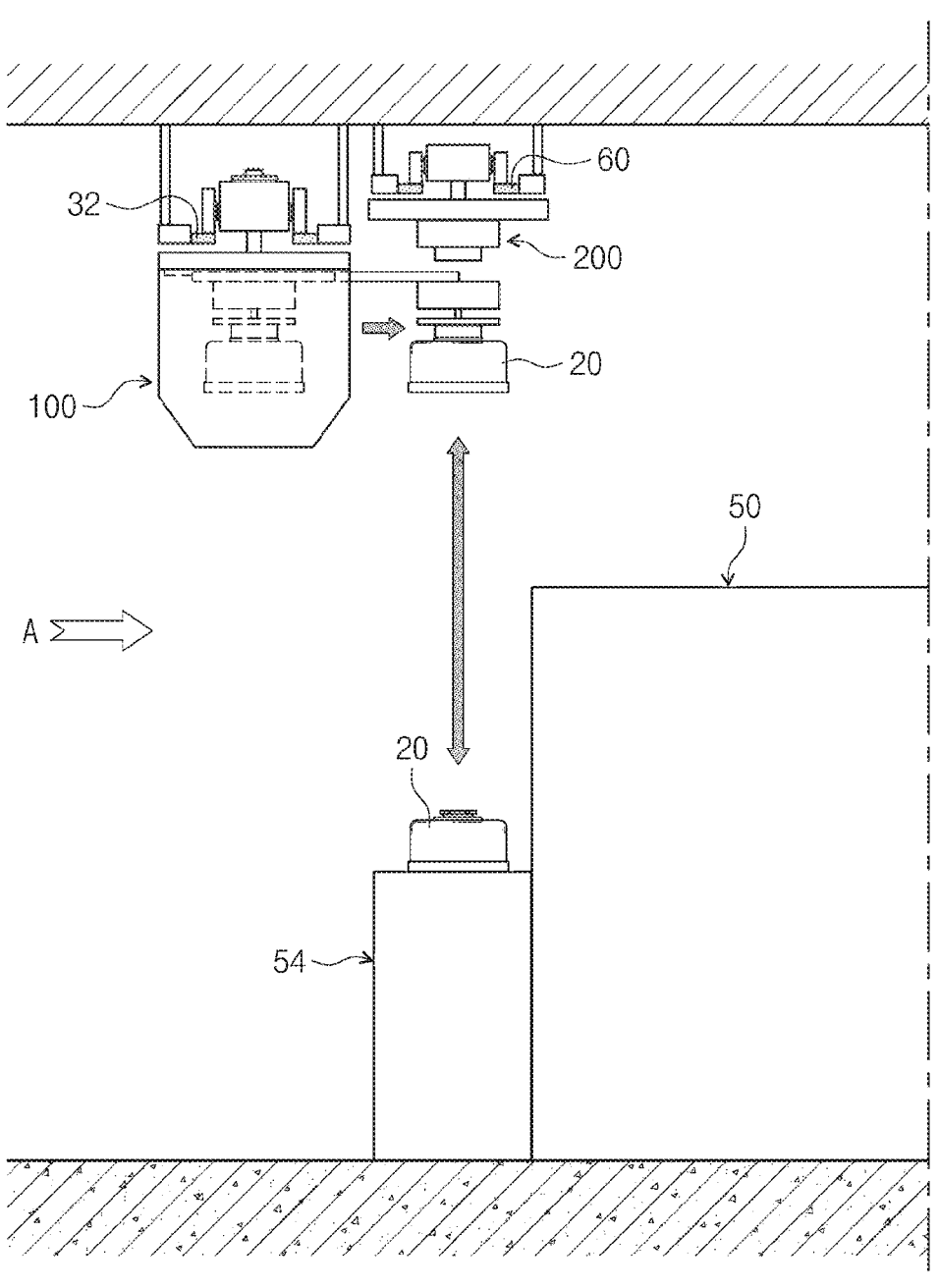
FIG. 2 is a diagram illustrating an article transferring apparatus.
Figure 3:
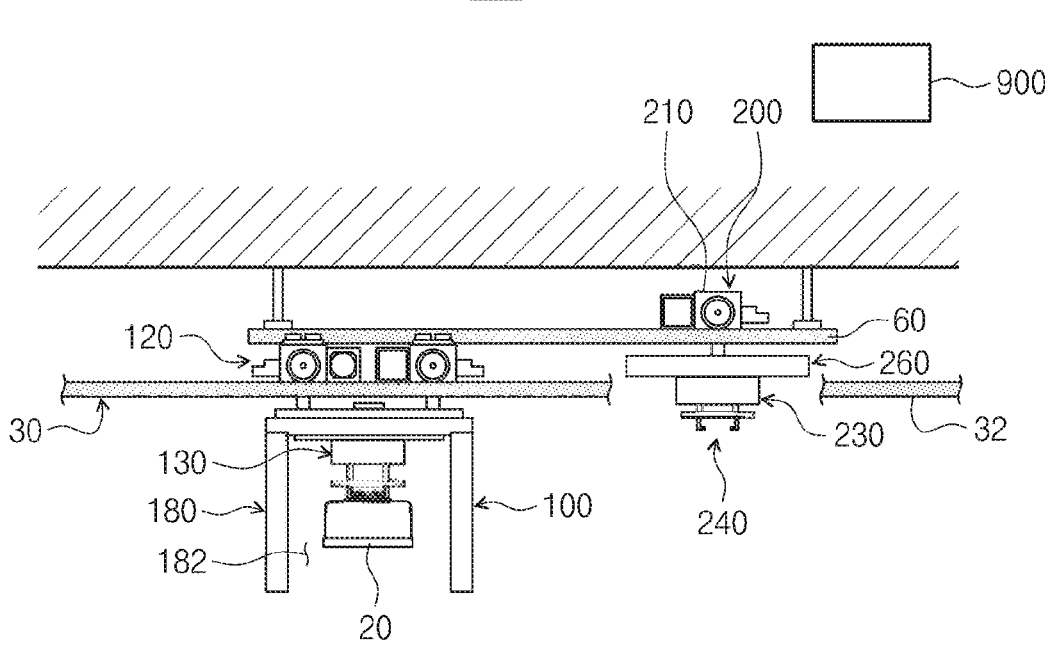
FIG. 3 is a diagram of the article transferring apparatus viewed from direction A indicated in FIG. 2.
Figure 3:
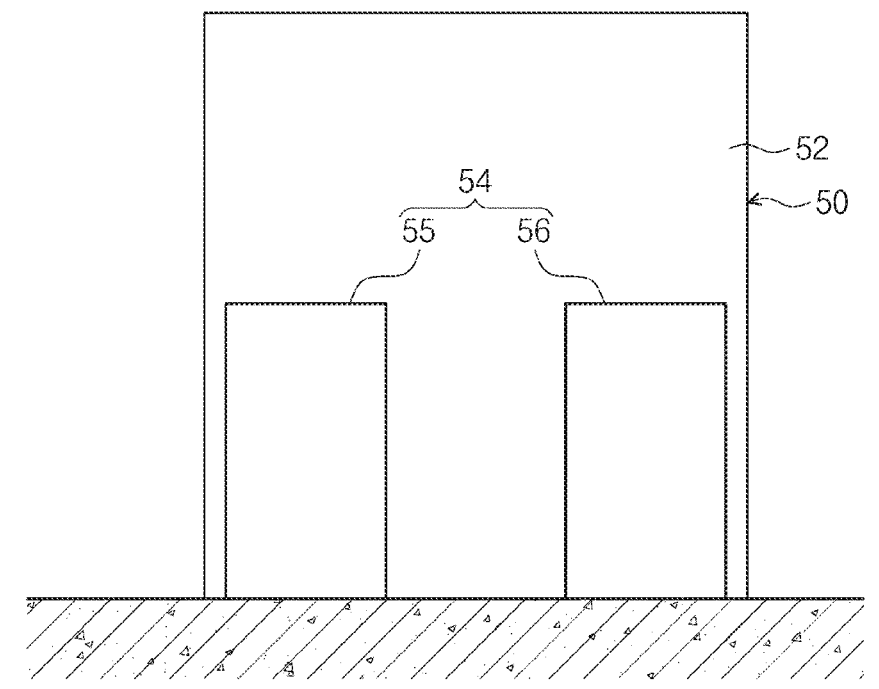
Figure 4:
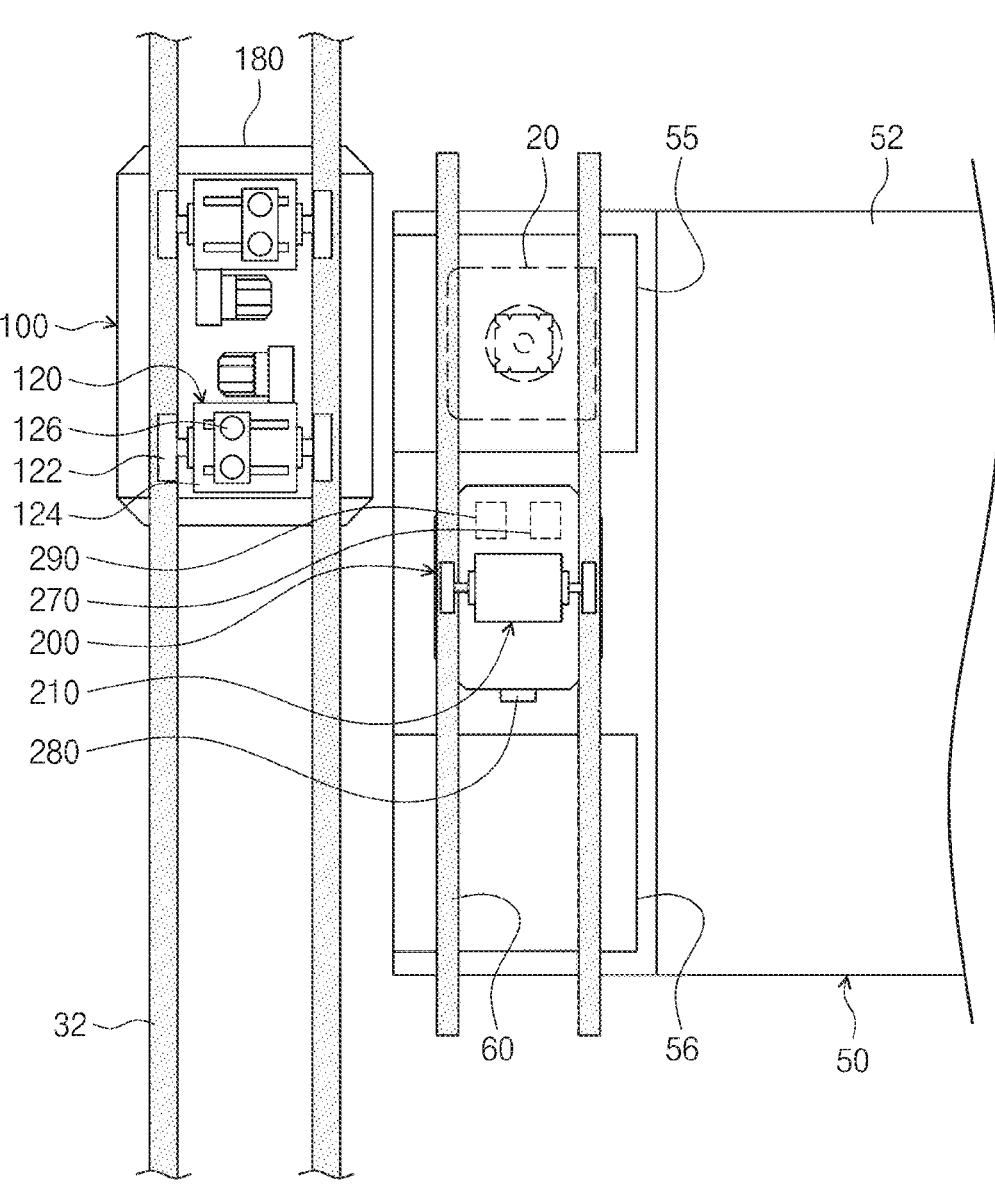
FIG. 4 is a top plan view of the article transferring apparatus shown in FIG. 2.
Figure 5:
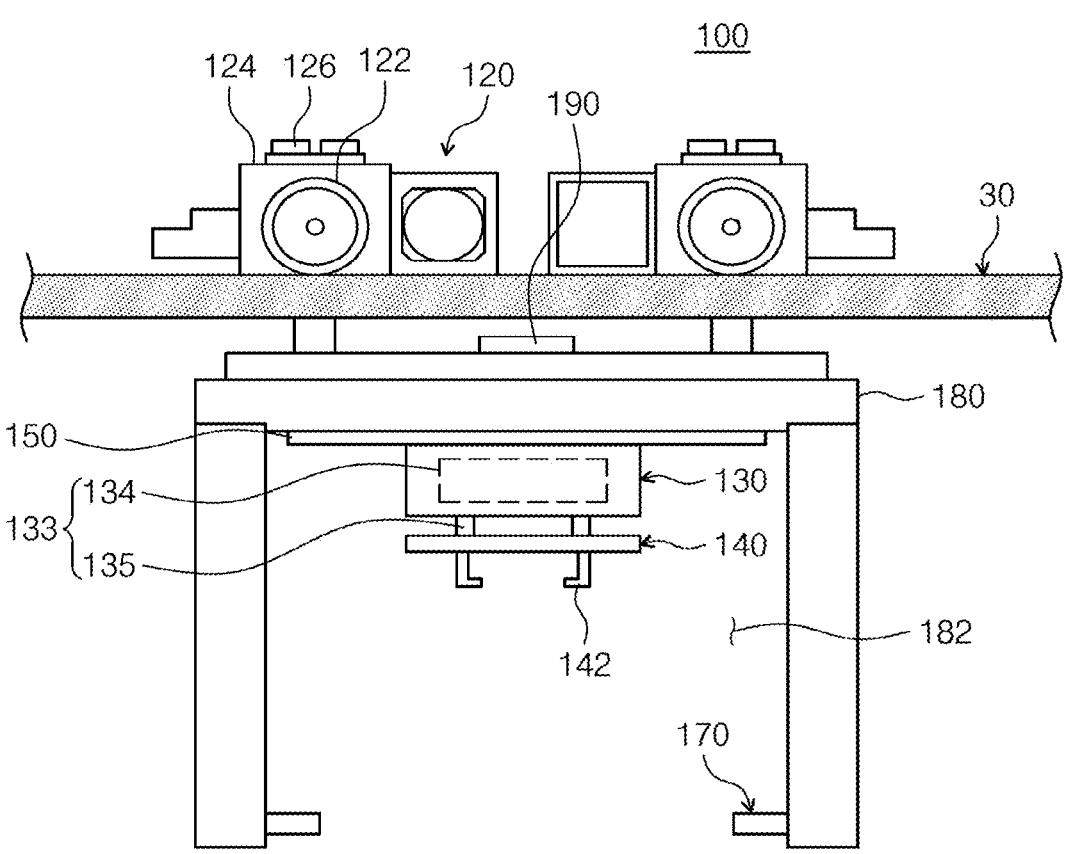
FIG. 5 is a diagram illustrating a main transferring vehicle.
Figure 6:
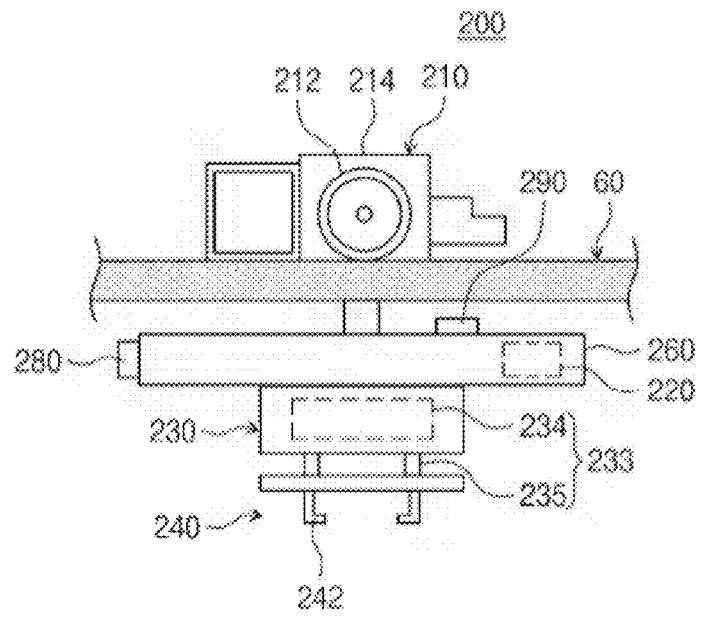
FIG. 6 is a diagram illustrating a sub-transferring vehicle.
Figure 7:
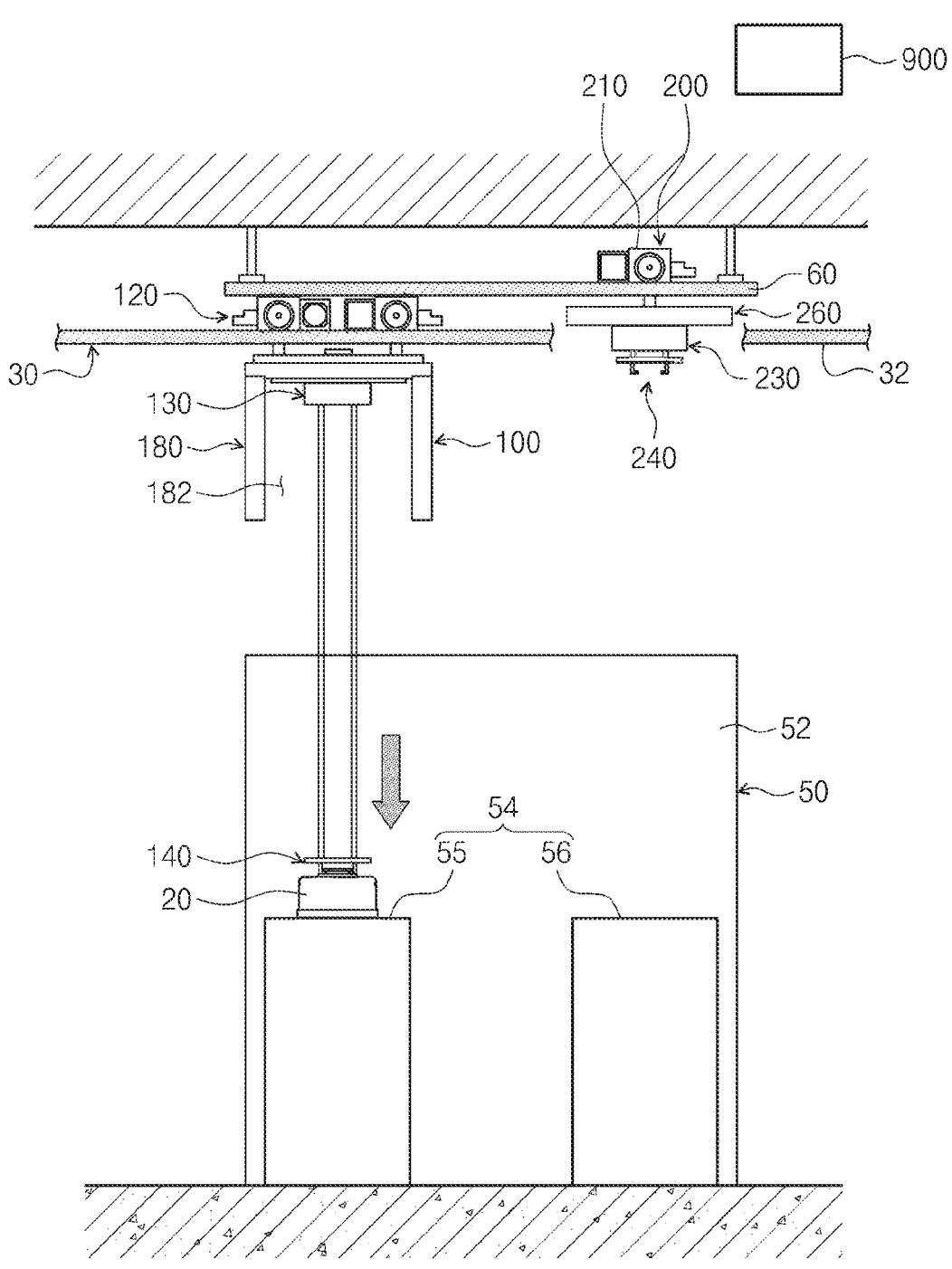
FIGS. 7 to 12 are diagrams illustrating a step-by-step process of transferring a transferring target article at a transferring destination place.
Figure 8:
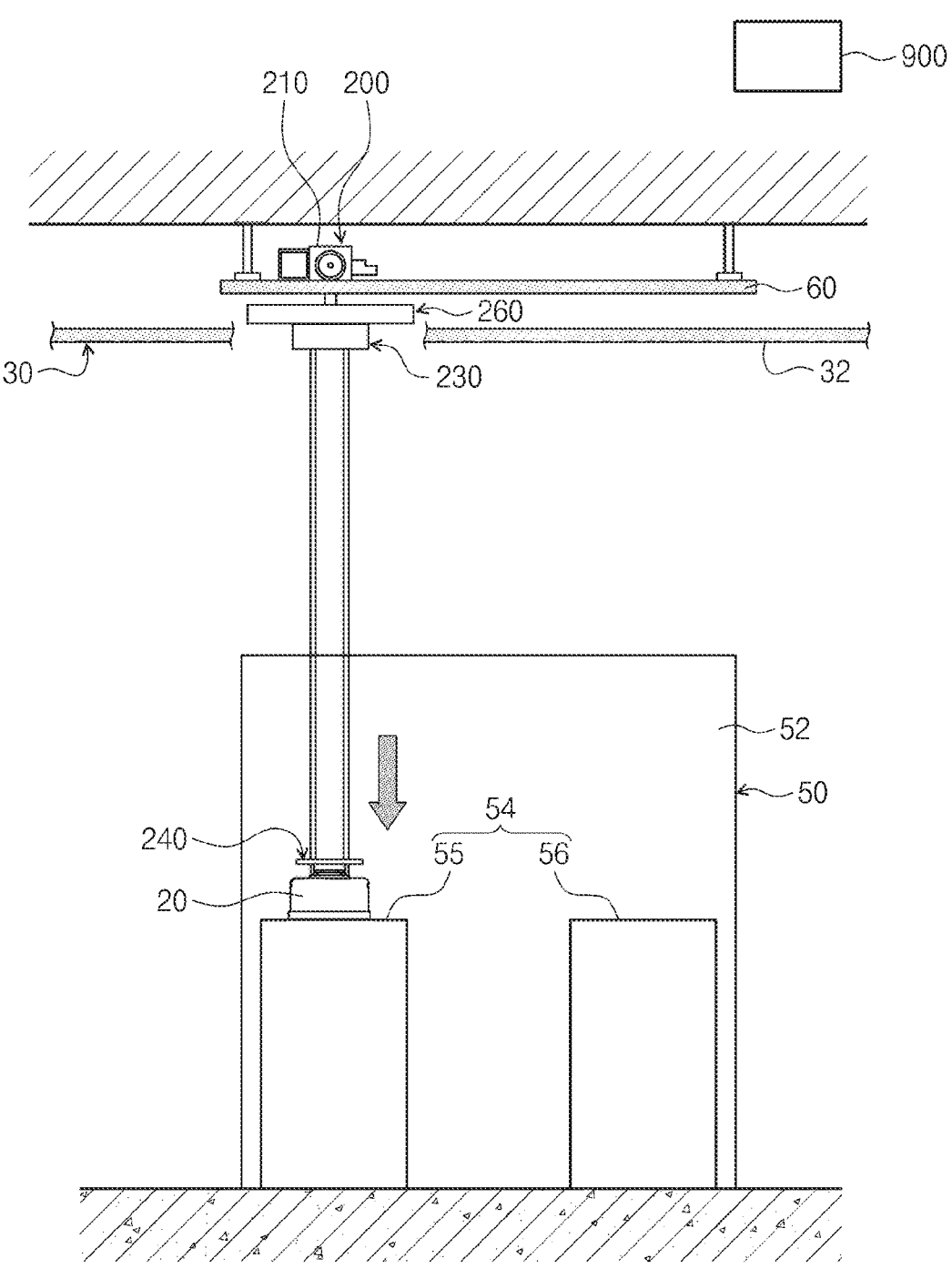
Figure 9:
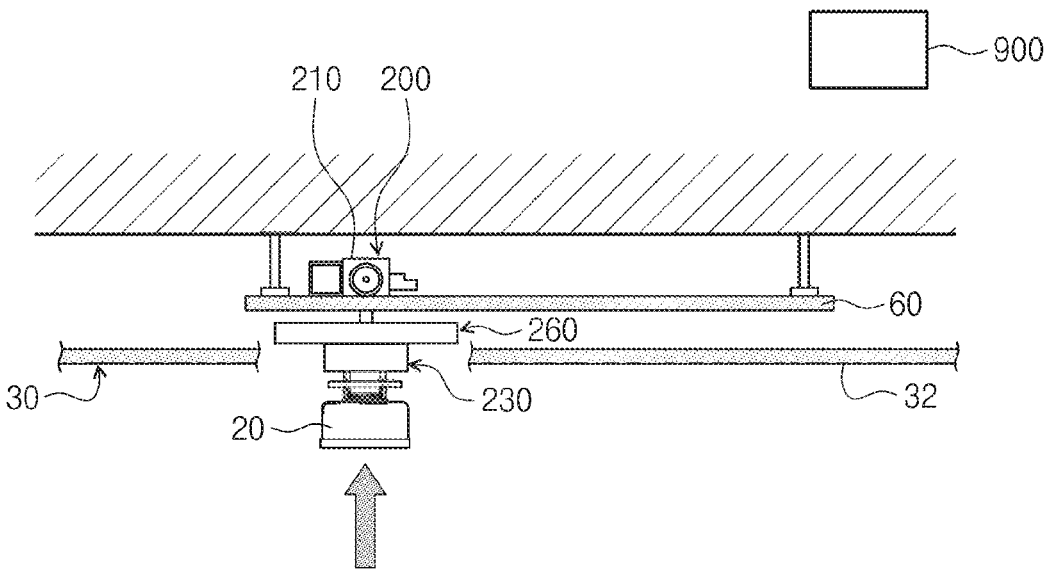
Figure 9:
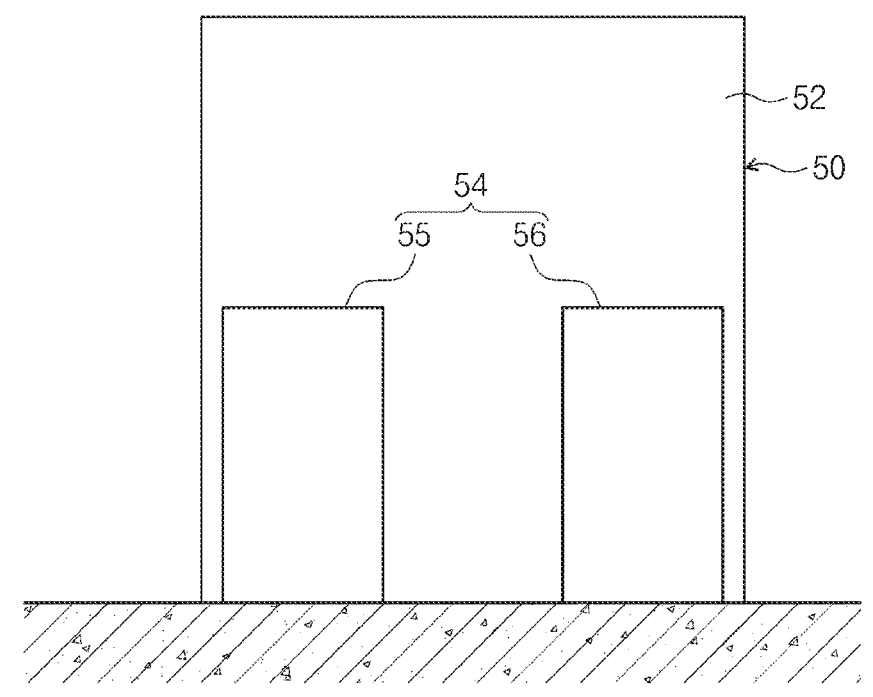
Figure 10:
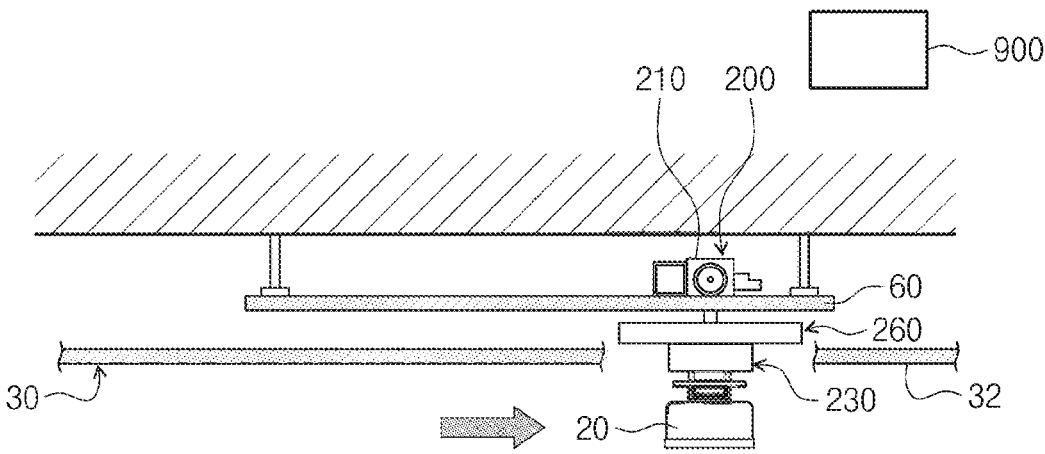
Figure 10:
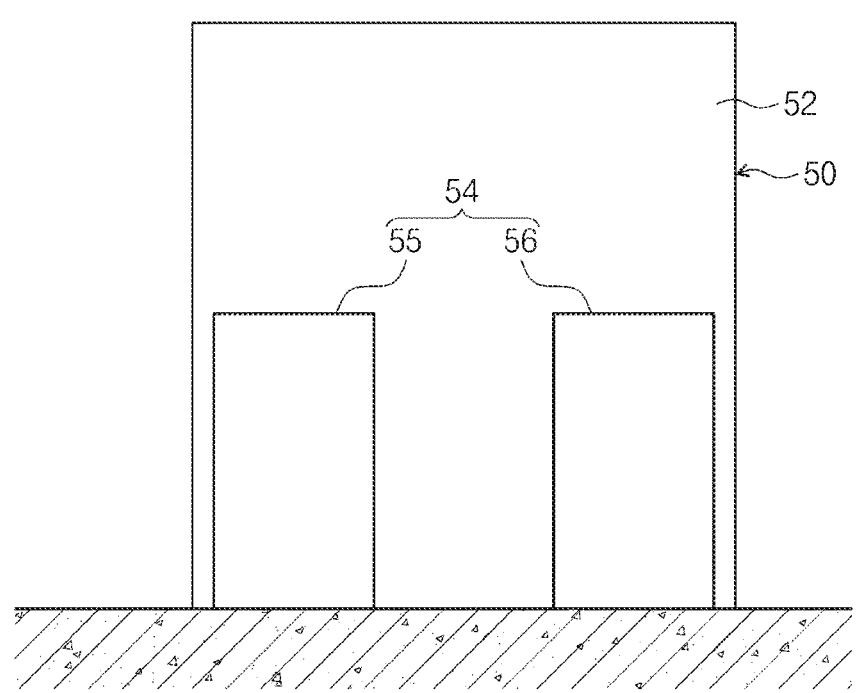
Figure 11:
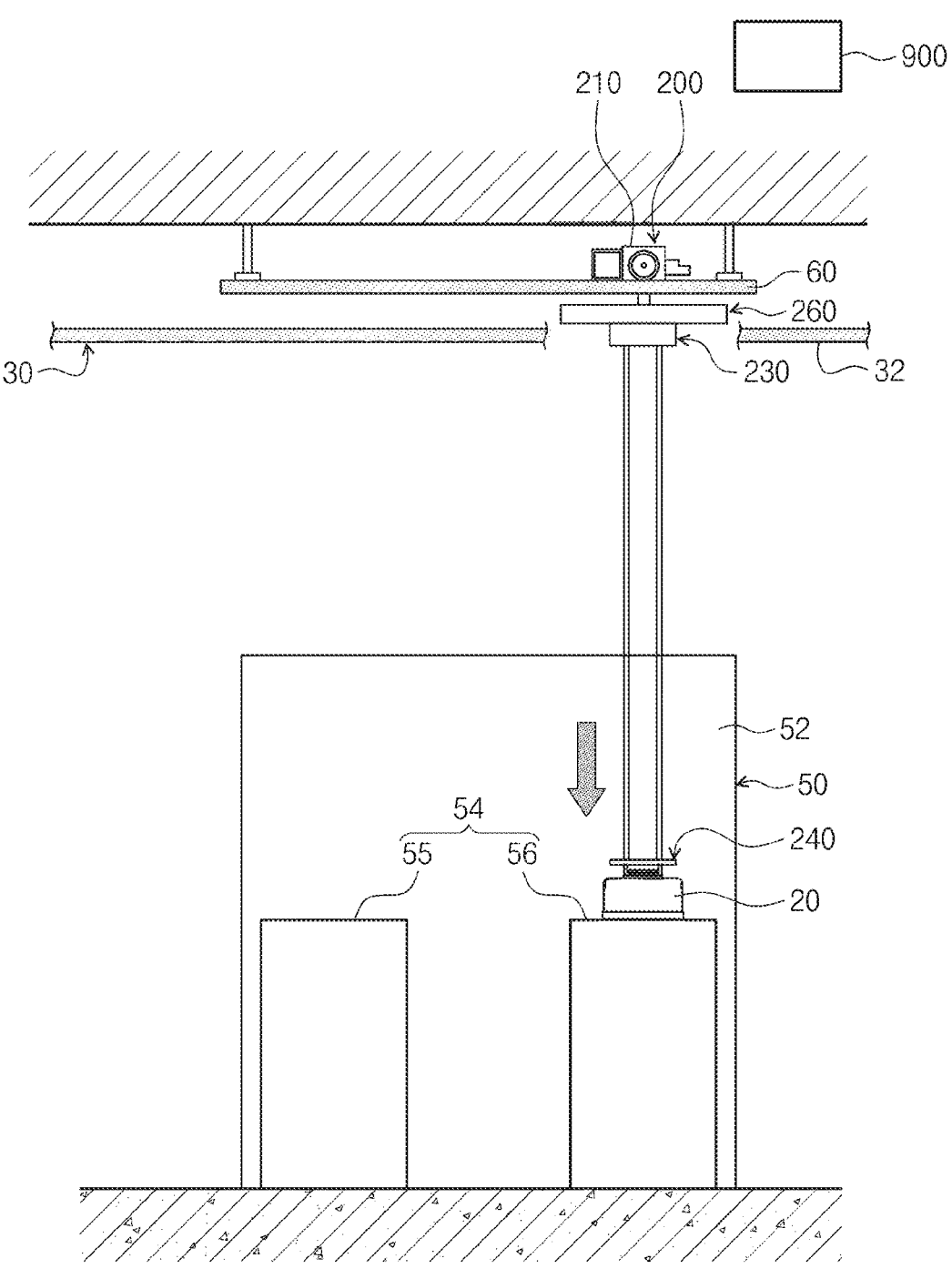
Figure 12:
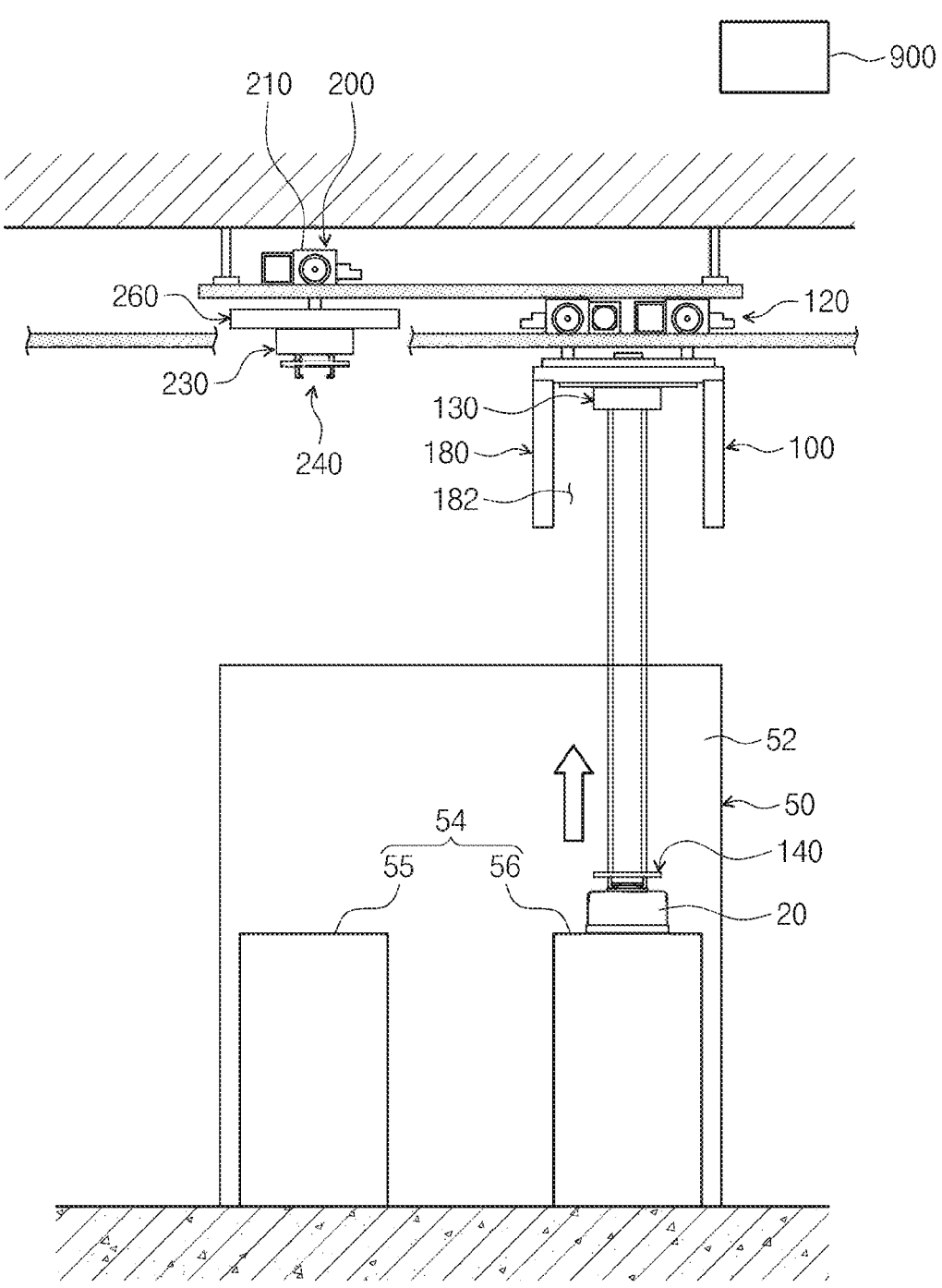

FIGS. 2 to 4 are diagrams illustrating the article transferring apparatus, FIG. 5 is a diagram illustrating the main transferring vehicle, and FIG. 6 is a diagram illustrating the sub-transferring vehicle.

As shown in FIGS. 2 to 6, the article transferring apparatus 10 may include the moving rail 32, the main transferring vehicle 100, the sub-rail 60, and the sub-transferring vehicle 200.

The main transferring vehicle 100 transfers the transferring target article 20. In the present embodiment, the main transferring vehicle 100 transfers the transferring target article 20 in a suspended state.

In the present embodiment, the main transferring vehicle 100 may be a transferring vehicle including a vehicle 120, a vehicle main body 180, a hoist module 130, a hand unit 140, a drop preventing member 170, a slider 150, and a control unit 190.

The vehicle 120 is a moving module that travels along the travelling rail 32 provided along the ceiling of a semiconductor manufacturing line by a separate driving unit. The vehicle 120 may include a moving body 210 having driving wheels 122 on both sides. An actuator (for example, a driving motor) for rotating the driving wheel 212 may be provided in the body 124. The body 124 travels along the travelling rail 32. Specifically, the body 124 may travel while the driving wheels 122 rotate in a state of being in contact with the travelling rail 32. In the meantime, a steering wheel 126 may be provided on the top of the body 124. The steering wheel 126 is configured to be movable along a horizontal direction perpendicular to the direction of travel of the body 124. For example, the steering wheel 126 may move in a left and right direction of the body 124. The steering wheel 126 may selectively contact a straight steering rail (not illustrated) to guide straight driving and a diverging steering rail (not illustrated) to guide diverging driving.

The vehicle main body 180 is connected to the vehicle 120 below the travelling rail 32. The upper side of the vehicle main body 180 may be connected to the lower side of the vehicle 120 by at least one connection part. The vehicle main body 180 provides an interior space 182 in which the transferring target article 20 is located.

The vehicle main body 180 may be formed to have a structure having both open sides and an open lower side to allow the transferring target article 20 to be moved in the left-right direction and in a downward direction in the interior space 182. Herein, both sides may be perpendicular to the moving direction of the main transferring vehicle 100.

For example, the hoist module 130 may load and unload the transferring target article 20. The hoist module 130 unloads the transferring target article 20 from the loading place to the interior space 182, or loads the transferring target article 20 from the interior space 802 to the loading place. The transferring target article 20 is transferred through the open bottom surface of the vehicle main body 180. The hoist module 130 may be provided in the vehicle main body 180. The hoist module 300 includes a hoisting unit 133 for hoisting the hand unit 140. The hoist module 130 is moved in a horizontal direction by the slider 150. The hoist module 130 elevates the hand unit 140 in the state of being moved, by the slider 150, to a position where the transferring target article 20 can be loaded/unloaded.

The hoisting unit 133 moves the hand unit 400 in the upward and downward direction. The hoisting unit 133 may include a driving unit 134 and hoisting belts (or suspending member, such as a wire) 135. The hoisting belt 135 of the hoisting unit 133 may be connected to the hand unit 140. The hoisting belt 135 may move the hand unit 400 in the upward and downward direction by a driving force generated by the driving unit 134. For example, the driving unit 134 may generate driving force to wind or unwind the hoisting belt 135 to move the hand unit 140 in the upward or downward direction. However, the present invention is not limited thereto, and the hoisting unit 133 may be modified into a variety of known devices that can hoist the hand unit 140.

The hand unit 140 is coupled to the hoist module 130. The hand unit 140 may include a gripper 142 which may be connected to the hoist module 130 through the plurality of hoisting belts 135 and grips the transferring target article 20. Additionally, the transferring target article 20 may include a flange 28 configured to be gripped by the gripper 142. The gripper 142 grips or ungrips the flange 28 of the transferring target article 20. Although not illustrated, the hand unit 140 may include a gripper driving unit (not illustrated) for driving the gripper 142. For example, the gripper driving unit may operate the gripper 142 by using a cam plate and a cam follower, and may also include a motor, a ball screw, and the like for moving the cam plate. However, the configuration of the hand unit 140 itself may be varied, and the scope of the present invention will not be limited thereby.

The drop preventing member 170 is provided in the vehicle main body 180. The drop preventing member 170 prevents the transferring target article 20 from dropping during moving of the vehicle 120. For example, even when the transferring target article 20 is in danger of being abnormally dropped, for example, when the hand unit 140 abnormally releases its grip on the transferring target article, the drop preventing member 700 also serves to prevent the drop of the transferring target article.

The sub-transferring vehicle 200 transfers the transferring target article 20 in a short segment. In the present embodiment, the sub-transferring vehicle 200 transfers the transferring target article 20 in a suspended state.

In the present embodiment, the sub-transferring vehicle 200 may be a transferring vehicle including a moving body 210, a vehicle main body 220, a hoist module 230, a hand unit 240, and a communication module 250 and a control unit 290.

The moving body 210 is a moving module that is driven along the sub-rail 60 by a separate driving unit. The moving body 210 may include a body 214 having driving wheels 212 on both sides. An actuator (for example, a driving motor) for rotating the driving wheel 212 may be provided in the body 214. The body 214 travels along the sub-rail 60. Specifically, the body 214 may travel while the driving wheels 212 rotate in a state of being in contact with the travelling rail 60.

In the present invention, the configuration of the moving body 210 is not limited thereto and may be changed to variously known linear driving devices capable of moving the vehicle main body 220 to the loading position at the in-port 55 and the unloading position at the out-port 56. For example, since the sub-transferring vehicle 200 reciprocates a particular section, it is desirable to apply a moving body that can be controlled simply rather than a vehicle method that requires complex control. The moving body that can be controlled simply may include a linear motor type (a conventional device having a stator and an operator), a belt type, a ball screw type (a conventional device including a ball screw that rotates by means of a coupler on a rotating rod rotated by a servo motor and a ball screw nut that converts the rotational motion of the ball screw into a linear transmission motion), a hydraulic cylinder type, and the like.

The vehicle main body 220 is connected to the moving body 210 at the downstream end of the sub-rail 60. The vehicle main body 220 may have an upper side connected to a lower side of the moving body 210 by at least one connection part.

The hoist module 230 may load and unload the transferring target article 20. The hoist module 230 unloads the transferring target article 20 from the in-port 55 and/or loads the transferring target article 20 into the out-port 56. The hoist module 230 may be provided in the vehicle main body 220. The hoist module 230 includes a hoisting unit 233 for hoisting the hand unit 240.

The hoisting unit 233 moves the hand unit 400 in the upward and downward direction. The hoisting unit 233 may include a driving unit 234 and hoisting belts (or suspending member, such as a wire) 235. The hoisting belt 235 of the hoisting unit 233 may be connected to the hand unit 240. The hosting belt 2 may move the hand unit 20 in the upward and downward direction by driving force generated by the driving unit 234. For example, the driving unit 234 may generate driving force to wind or unwind the hoisting belt 235 to move the hand unit 240 in the upward or downward direction. However, the present invention is not limited thereto, and the hoisting unit 233 may be modified into a variety of known devices that can hoist the hand unit 240.

The hand unit 240 is coupled to the hoist module 230. The hand unit 240 may include a gripper 242 which may be connected to the hoist module 230 through the plurality of hoisting belts 235 and grips the transferring target article 20. The gripper 242 grips or ungrips the flange 28 of the transferring target article 20. Although not illustrated, the hand unit 240 may include a gripper driving unit (not illustrated) for driving the gripper 242. For example, the gripper driving unit may operate the gripper 242 by using a cam plate and a cam follower, and may also include a motor, a ball screw, and the like for moving the cam plate. However, the configuration of the hand unit 240 itself may be varied, and the scope of the present invention will not be limited thereby.

The sub-transferring vehicle 200 may include a communication module 270 for wirelessly communicating with the higher-level controller 900 and the processing device 52. Wireless communication may include wireless LAN (Wifi), local area mesh networks (N: N, ad-hoc), Bluetooth, Zigbee, and short-range communications such as IrDA. The sub-transferring vehicle 200 may receive a transfer initiation signal from the processing device 52 or the higher-level controller 900 through wireless communication. When the transfer initiation signal is received through the communication module 270, the control unit 290 of the sub-transferring vehicle 200 performs a transferring operation of unloading the transferring target article 20 from the in-port 55 and loading the transferring target article 20 into the out-port 56.

Meanwhile, the sub-transferring vehicle 200 includes a detection sensor 280 that detects the main transferring vehicle 100. When the detection sensor 280 detects the main transferring vehicle 100, the control unit 290 immediately stops the motion of the sub-transferring vehicle 200 and moves the sub-transferring vehicle 200 to a safe standby position.

The higher-level controller 900 provides integrated control management of the main transferring vehicle 100 and the sub-transferring vehicle 200. The higher-level controller 900 stops the transferring motion of the sub-transferring vehicle 200 when the main transferring vehicle 100 loads/unloads the transferring target article into or from the in-port 55 or the out-port 56 to prevent a collision between the main transferring vehicle 100 and the sub-transferring vehicle 200.

FIGS. 7 to 12 are diagrams illustrating a step-by-step process of transferring a transferring target article at a transferring destination place.

A method of transferring a transferring target article at a transferring destination place may include (a) loading a transferring target article into an in-port, (b) moving the transferring target article placed in the in-port to an out-port, and (c) unloading the transferring target article placed in the out-port.

The task of moving the transferring target article 20 from the in-port 55 to the out-port 56 is performed by the sub-transferring vehicle 200, and the task of loading the transferring target article 20 into the in-port 55 or unloading the transferring target article 20 from the out-port 56 is performed by the main transferring vehicle 100.

Referring to FIGS. 7 to 12, the main transferring vehicle 100 loads the transferring target article 20 into the in-port 55. The transferring target article 20 loaded into the in-port 55 contains a photomask that is not process-treated, and a photomask is removed from the transferring target article 20 and fed into the processing device 52. After the photomask is removed, the empty transferring target article 20 is unloaded by the sub-transferring vehicle 200 and loaded into the out-port 56. The transferring target article 20 loaded into the out-port 56 receives the substrate that has been processed in the processing device 52. The transferring target article 20 containing the substrate is unloaded from the out-port 56 by the main transferring vehicle 100.

In the foregoing exemplary embodiments, the method is described on the basis of a flow chart as a series of operations or blocks, but the present invention is not limited to the order of operations, and the operations of the present invention may occur in a different order or concurrently with other operations as described above. Further, those skilled in the art will understand that the operations illustrated in the flow chart are not exclusive, and that other operations may be included or one or more operations of the flow chart may be deleted without affecting the scope of the present invention.

Figure 13:
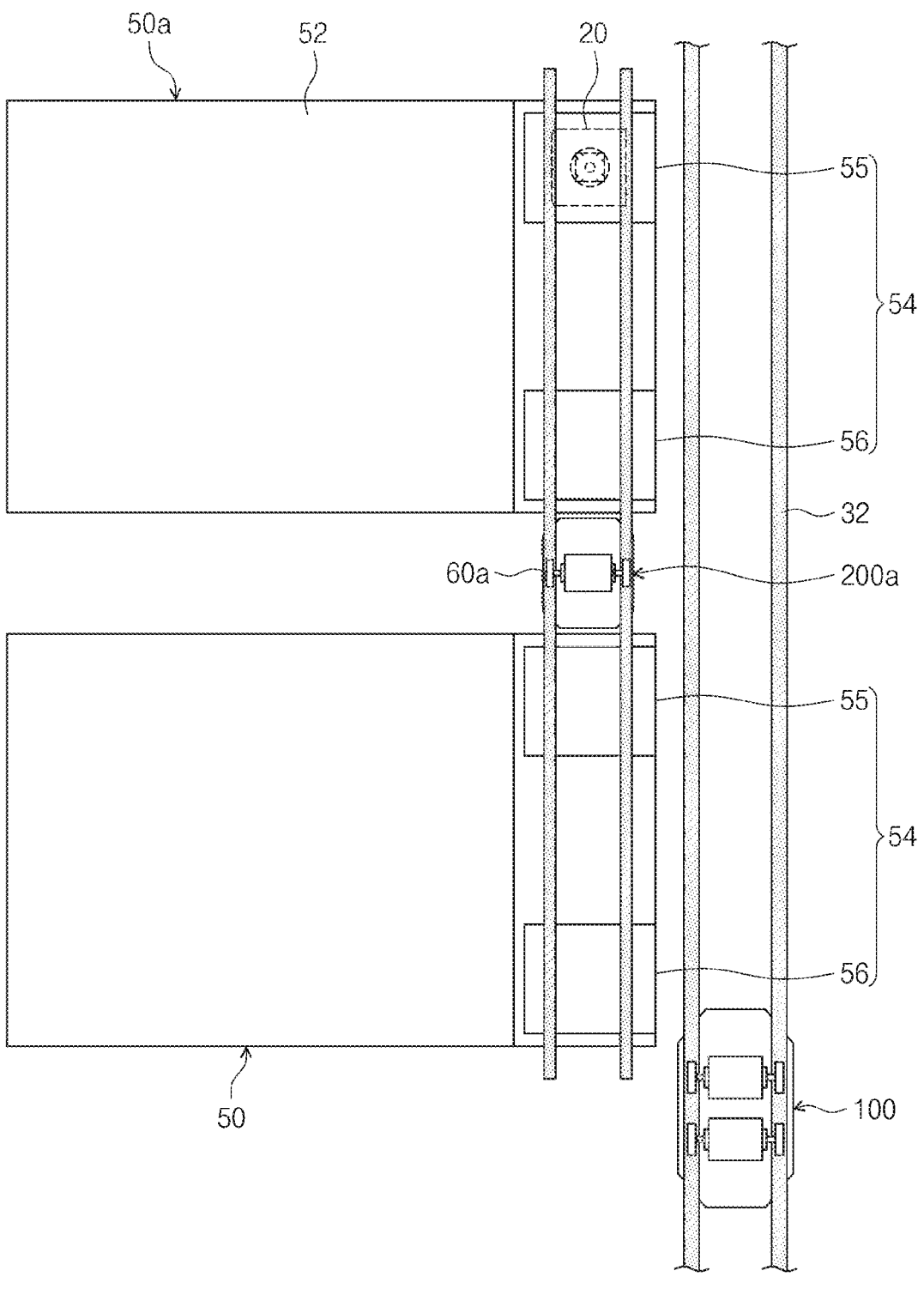
FIG. 13 is a diagram illustrating a modified example of the sub-transferring vehicle.
Figure 14:
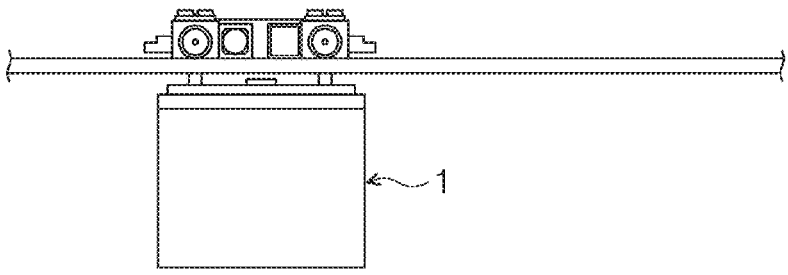
FIG. 14 is a diagram illustrating a process of loading/unloading a container at a post-process illustrated.
Figure 14:
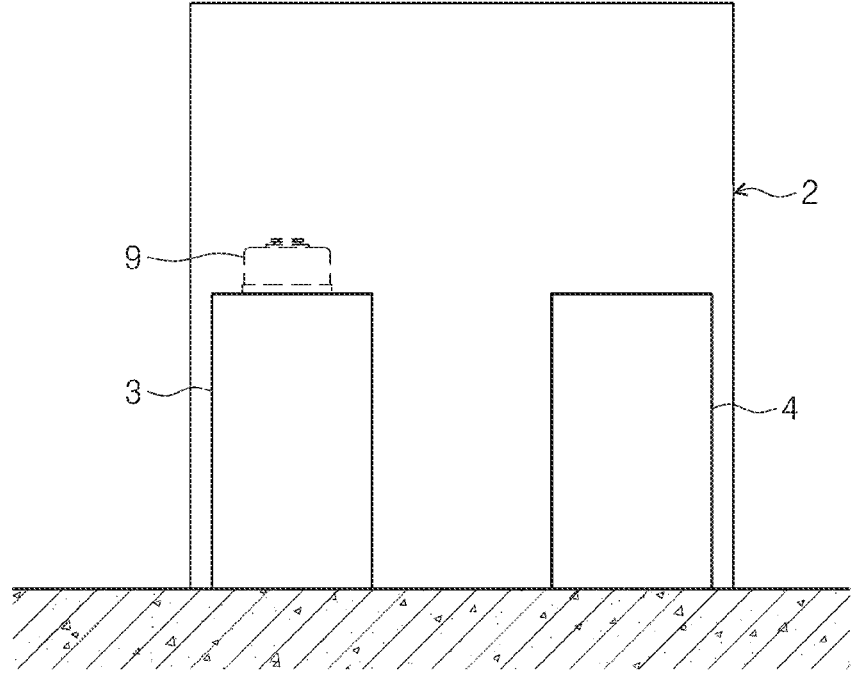

FIG. 13 is a diagram illustrating a modified example of the sub-transferring vehicle.

As shown in FIG. 13, an article transferring apparatus 10*a* may be provided for one sub-transferring vehicle 200*a* to perform the transfer of a transferring target article 20 at two transferring destination places 50. To this end, a sub-rail 60*a* may be provided to traverse in-ports 55 and out-ports 56 of the two transferring destination places 50.

The foregoing exemplary embodiments are presented for helping the understanding of the present invention, and do not limit the scope of the present invention, and it should be understood that various modified exemplary embodiments from the foregoing exemplary embodiments are also included in the scope of the present invention. The technical protection scope of the present invention should be determined by the technical spirit of the claims, and it should be understood that the technical protection scope of the present invention is not limited to the literal description of the claims itself, but is substantially equivalent to the technical value.

What is claimed is:

1. An article transferring apparatus, comprising:

a main rail along a ceiling of a substrate manufacturing line in which a plurality of process modules for treating a substrate are arranged;

a main transferring vehicle configured to move along the main rail and load and unload a container containing a substrate to and from a select one of the process modules;

a sub-rail installed on a ceiling corresponding to an upper portion of a corresponding one of the process modules; and a sub-transferring vehicle configured to move along the sub-rail and load and unload a container between a first loading part and a second loading part of the corresponding one of the process modules, wherein the sub-transferring vehicle further includes a detection sensor configured to detect the main transferring vehicle.

2. The article transferring apparatus of claim 1, further comprising:

a control unit configured to output a transfer command of the container to the main transferring vehicle and the sub-transferring vehicle, wherein the control unit is configured to stop transferring the container of the sub-transferring vehicle when the main transferring vehicle loads or unloads the container to or from the first loading part or the second loading part to prevent a collision between the main transferring vehicle and the sub-transferring vehicle.

3. The article transferring apparatus of claim 1, wherein the first loading part is configured to be loaded with a container containing a substrate that is not process-treated, and the second loading part is configured to be loaded with a container containing a substrate that has been process-treated.

4. The article transferring apparatus of claim 3, wherein the sub-transferring vehicle is configured to transfer the container from the first loading part to the second loading part, and the container transferred by the sub-transferring vehicle is configured to be in an empty state when the substrate that is not process-treated has been inserted into the corresponding one of the process modules.

5. The article transferring apparatus of claim 4, wherein the main transferring vehicle is configured to load the container containing the substrate that is not process-treated to the first loading part, and unload the container containing the substrate that has been process-treated from the second loading part.

6. The article transferring apparatus of claim 4, wherein the sub-rail is configured to pass through upper portions of the first loading part and the second loading part.

7. The article transferring apparatus of claim 6, wherein the sub-rail is parallel with the main rail.

8. The article transferring apparatus of claim 4, wherein the main transferring vehicle includes:

a vehicle configured to move along the main rail;

a main body connected to the vehicle, and including an interior space in which a container is to be accommodated;

a hoist unit in the main body, and configured to hoist a belt by winding or unwinding the belt;

a hand unit fixed to one end of the belt, and configured to grip a container; and a slide unit configured to move the hoist unit in a horizontal direction.

9. The article transferring apparatus of claim 4, wherein the sub-transferring vehicle includes:

a moving body configured to move along the sub-rail;

a hoist unit configured to hoist a belt by winding or unwinding the belt; and a hand unit fixed at one end of the belt, and configured to grip the container.

10. The article transferring apparatus of claim 4, wherein in the corresponding one of the process modules, the first loading part and the second loading part are parallel with the sub-rail, and the sub-rail is on the corresponding one of the process modules.

11. An article transferring apparatus, comprising:

a main rail along a ceiling of a substrate manufacturing line in which process modules for treating a substrate are arranged;

a main transferring vehicle configured to move along the main rail and load and unload a container containing a substrate to and from a select one of the process modules;

a sub-rail installed on a ceiling corresponding to an upper portion of a corresponding one of the process modules; and a sub-transferring vehicle configured to move along the sub-rail and configured to load and unload a container between a first loading part and a second loading part of the corresponding one of the process modules; and a control unit configured to output a transfer command of the container to the main transferring vehicle and the sub-transferring vehicle, wherein the control unit is configured to stop transferring the container of the sub-transferring vehicle when the main transferring vehicle loads or unloads the container to or from the first loading part or the second loading part to prevent a collision between the main transferring vehicle and the sub-transferring vehicle, the main transferring vehicle is configured to load a container containing a substrate that is not process-treated to the first loading part, and unload a container containing a substrate that has been process-treated from the second loading part, the sub-transferring vehicle is configured to transfer the container from the first loading part to the second loading part, the container transferred by the sub-transferring vehicle is configured to be in an empty state when the substrate that is not process-treated has been inserted into the corresponding one of the process modules, and the sub-transferring vehicle further includes a detection sensor configured to detect the main transferring vehicle.

12. The article transferring apparatus of claim 11, wherein in the corresponding one of the process modules, the first loading part and the second loading part are parallel with the sub-rail, and the sub-rail is in upper portions of the first loading part and the second loading part on the corresponding one of the process modules, and is parallel with the main rail.

13. An article transferring apparatus, comprising:

a main rail along a ceiling of a substrate manufacturing line in which process modules for treating a substrate are arranged;

a main transferring vehicle configured to move along the main rail and load and unload a container containing a substrate to and from a select one of the process modules;

a sub-rail installed on the ceiling corresponding to an upper portion of a corresponding one of the process modules; and a sub-transferring vehicle configured to move along the sub-rail and load and unload a container between a first loading part and a second loading part of the corresponding one of the process modules, wherein the sub-rail is disposed to pass through upper portions of the first loading part and the second loading part, wherein the main transferring vehicle includes a vehicle configured to move along the main rail, a main body connected to the vehicle, and providing an interior space in which a container is located, a hoist unit provided in the main body, and configured to hoist a belt by winding or unwinding the belt, a hand unit fixed to one end of the belt, and configured to grip a container, and a slide unit configured to move the hoist unit in a horizontal direction.

14. The article transferring apparatus of claim 13, wherein the sub-transferring vehicle includes:

a moving body configured to move along the sub-rail;

a hoist unit configured to hoist a belt by winding or unwinding the belt; and a hand unit fixed at one end of the belt, and configured to grip the container.

15. The article transferring apparatus of claim 13, wherein the main rail does not overlap the sub-rail when viewed from above.

16. The article transferring apparatus of claim 13, wherein the sub-rail is positioned higher than the main rail.

17. The article transferring apparatus of claim 13, wherein the main rail does not overlap the first loading part and the second loading part of the corresponding one of the process modules when viewed from above.

* * * * *